United States Patent
Heranney

(12) 
(10) Patent No.: US 6,672,648 B2
(45) Date of Patent: Jan. 6, 2004

(54) IMPACT ENERGY ABSORBING DEVICE FOR MOTOR VEHICLE DOOR

(75) Inventor: Yves Heranney, Montbeliard (FR)

(73) Assignee: Faurecia Industries, Boulogne Billancourt (FR)

( * ) Notice: Subject to any disclaimer, the term of this patent is extended or adjusted under 35 U.S.C. 154(b) by 23 days.

(21) Appl. No.: 10/069,050
(22) PCT Filed: Jun. 28, 2001
(86) PCT No.: PCT/FR01/02074
 § 371 (c)(1),
 (2), (4) Date: Feb. 21, 2002
(87) PCT Pub. No.: WO02/00473
 PCT Pub. Date: Jan. 3, 2002

(65) Prior Publication Data
 US 2002/0113462 A1 Aug. 22, 2002

(30) Foreign Application Priority Data
 Jun. 29, 2000 (FR) .............................. 00/08428

(51) Int. Cl.[7] ................................................. B60J 5/04
(52) U.S. Cl. .................................... 296/146.6; 296/189
(58) Field of Search ................................ 296/188, 189, 296/146.1, 146.2, 146.3, 146.6, 146.5; 49/502

(56) References Cited

U.S. PATENT DOCUMENTS 4,231,607 A 11/1980 Bohlin
4,272,103 A * 6/1981 Schmid et al. .............. 296/189
5,482,344 A 1/1996 Walker et al.
5,580,119 A * 12/1996 Uchida et al. .............. 296/189

FOREIGN PATENT DOCUMENTS

| DE | 42 28 626 | | 3/1994 |
| FR | 2 759 952 | | 8/1998 |
| JP | 403045421 A | * | 2/1991 |
| JP | 10 016564 | | 1/1998 |
| RU | WO-9917957 A2 | * | 4/1999 |

* cited by examiner

Primary Examiner—D. Glenn Dayoan
Assistant Examiner—Jason Morrow
(74) Attorney, Agent, or Firm—Young & Thompson

(57) ABSTRACT

Device for absorbing impact energy for a door of a motor vehicle, the door being in the form of a hollow box in which is arranged a glass panel (12) capable of sliding between a lowered position and a raised position, the absorbing device (30) being arranged in a lower region of the box and comprising two shock-absorbing blocks (32, 33) defining a passageway for the glass panel (12) therebetween. The device comprises movable members (39) for mechanical connection which are arranged between the shock-absorbing blocks (32, 33), the members (39) each assuming an active position, in the absence of the glass panel, in which they ensure mechanical continuity between the blocks (32, 33) and constitute a supplementary component for absorbing impact energy, and moving out of the way to assume an inactive position when the glass panel passes through.

10 Claims, 3 Drawing Sheets

IMPACT ENERGY ABSORBING DEVICE FOR MOTOR VEHICLE DOOR

BACKGROUND OF THE INVENTION

The present invention relates to an impact-absorbing device for a door of a motor vehicle, the door being in the form of a roughly parallelepipedal hollow box which has an upper face and a lower face and in which is arranged a glass panel capable of sliding substantially vertically between a lowered position in which it is substantially retracted into the box and a raised position in which it is substantially deployed through the opening of the upper face, the absorbing device being arranged in a lower region of the box and comprising two shock-absorbing blocks defining a passageway for the glass panel therebetween.

In known devices of that type, the two shock-absorbing blocks are completely unconnected in order to form a space defining the passageway for the glass panel and are constituted by separate components mounted independently in the box during the operation of manufacturing the door. Each of the blocks is secured independently of the other to the adjacent lateral inner wall of the box.

However, such devices are not entirely satisfactory for the reasons given hereinafter.

First of all, the space formed between the two absorbing blocks constitutes a discontinuity of material which is detrimental to the impact-absorbing performance of the device, the space being empty and devoid of deformation members. The space has no other function than to define the passageway for the glass panel, and therefore constitutes wasted space.

Moreover, the time taken to mount the blocks in the door box and the number of securing points required, owing to the fact that the blocks are mounted separately, are not optimum.

In addition, sealing on the side where the interior face of the door is located is effected by a sealing sheet which extends from the upper portion of the box as far as its lower portion, passing into the space provided for the passage of the glass panel in order to avoid the regions for securing the adjacent absorbing block to the respective inner face of the box. Such an arrangement of the sealing sheet necessitates a delicate operation of adhesively bonding the sheet, even though this sheet arrangement does not ensure optimum sealing.

The invention aims principally to overcome those disadvantages.

SUMMARY OF THE INVENTION

For that purpose, a device for absorbing impact energy for a door of a motor vehicle according to the invention comprises movable members for mechanical connection between the shock-absorbing blocks, each of those members being arranged in the passageway for the glass panel in order to assume an active position, in the absence of the glass panel, in which it ensures mechanical continuity between the blocks and constitutes a supplementary component for absorbing impact energy, and in order to move out of the way to assume an inactive position when the glass panel passes through.

According to other features of the invention:

the movable members are flaps pivoting about a respective hinge part which is fixedly joined to at least one of the blocks, the hinge part being provided with a resilient member which returns the flap to its active position;

each flap has a substantially flat face defining a principal plane and, when the flap is in the active position, the principal plane extends substantially horizontally;

the hinge parts are fixedly joined to an intermediate component secured to one of the blocks;

notches are formed in at least one of the blocks, facing each hinge part, in such a manner as to form an abutment for a free end portion of the respective flap, thus defining the active position of the flap;

the movable members and the blocks are formed from the same material; and the blocks are secured to a common anchoring component which is itself rigidly fixed to the box.

The invention relates also to a motor vehicle door comprising an absorbing device as described above.

According to another feature, a motor vehicle door according to the invention comprises a sealing sheet adhesively bonded to a face of the box arranged towards the interior of the vehicle in order to cover a face of the corresponding block, which face is opposite the face thereof defining the passageway for the glass panel.

BRIEF DESCRIPTION OF THE DRAWINGS

Embodiments of the invention will now be described with reference to the appended drawings in which.

[1] Translator's note: although "adsorbing" appears here in the French text it seems clear from the text as a whole that "absorbing" was intended.

Figure 2:
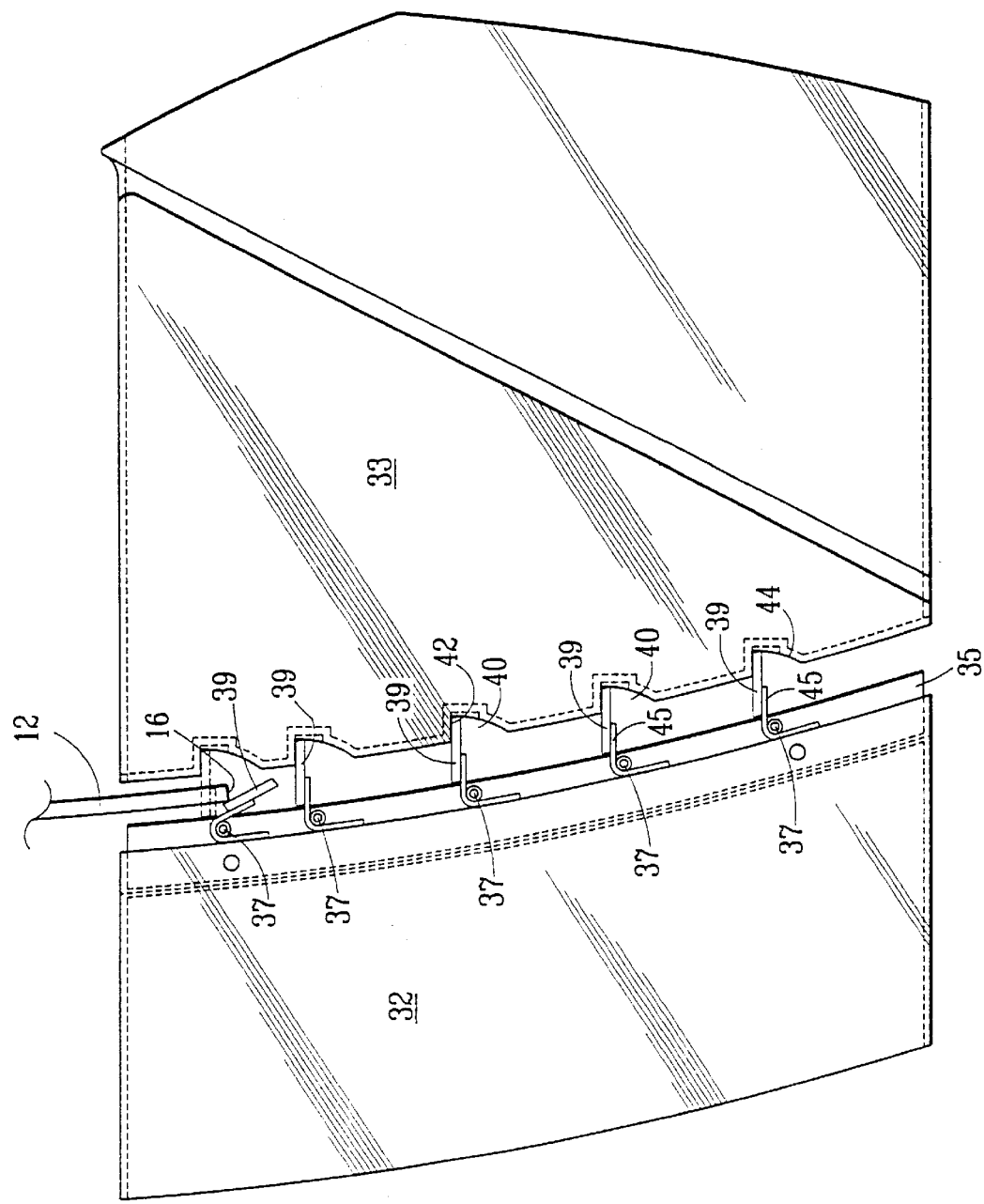
FIG. 2 is a detail view in elevation of the absorbing[1] device represented in FIG. 1.
Figure 3:
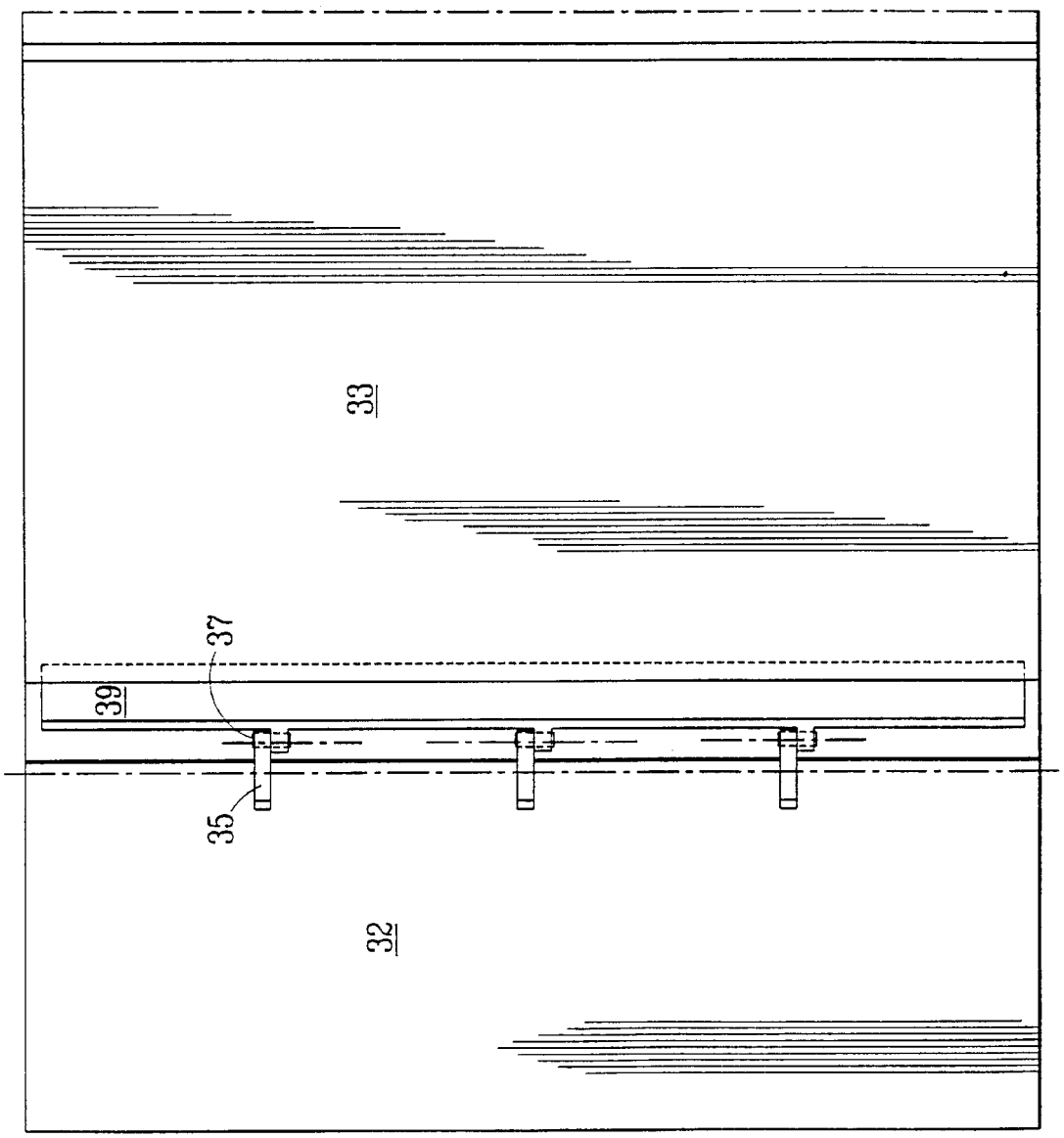

FIG. 3 is a top view of the device shown in FIG. 2.

DETAILED DESCRIPTION OF THE PREFERRED EMBODIMENTS

Figure 1:
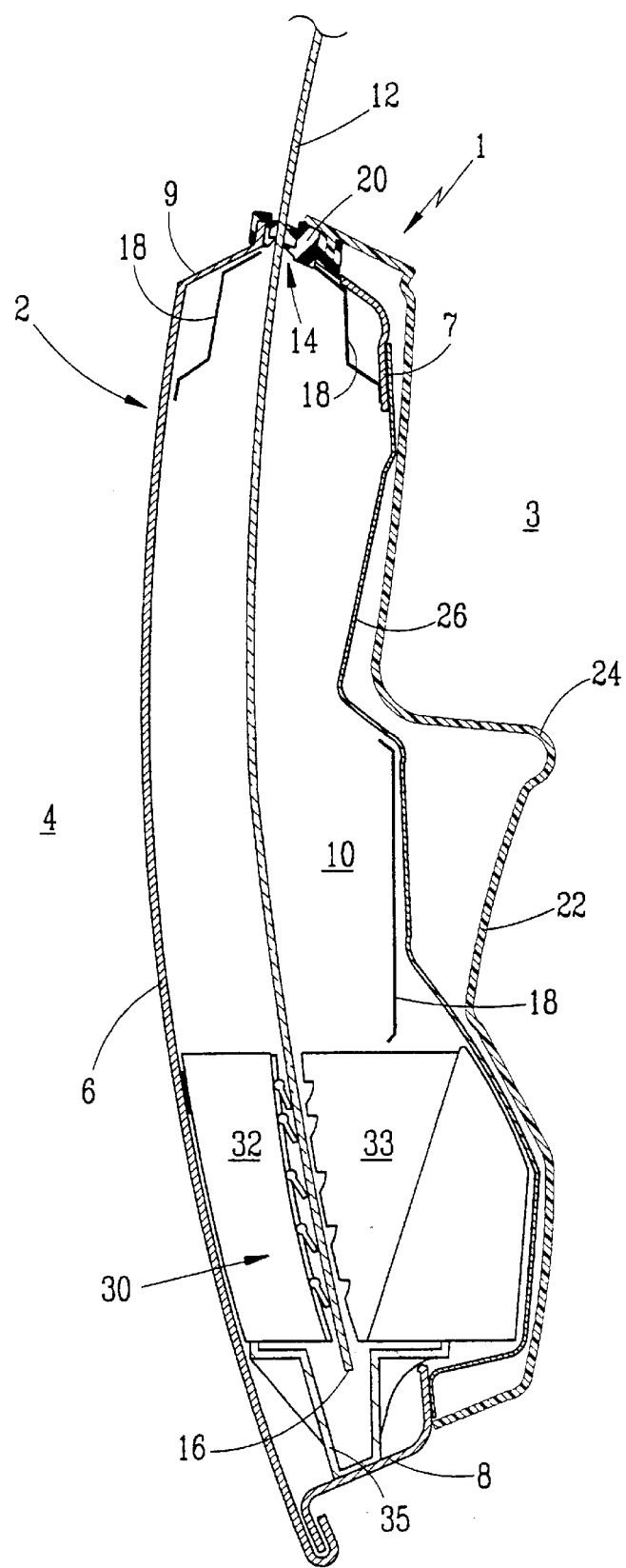
FIG. 1 is a diagrammatic sectioned view along a transverse vertical plane of a door comprising an absorbing device according to the invention.

FIG. 1 shows a motor vehicle door in vertical cross-section, the door 1 being in the form of a roughly parallelepipedal hollow box. The door 1 defines a separation between a vehicle passenger space 3 and the exterior 4. The box 2 is constituted by sheet-metal walls, one 6 of which constitutes a substantially vertical exterior lateral wall arranged opposite a likewise substantially vertical interior lateral wall 7 extending on the side where the passenger space 3 is located. The lateral walls 6, 7 are joined by a lower wall 8 and an upper wall 9. The inner volume 10 of the box 2 accommodates at least partially a glass panel 12 mounted to slide in the box 2 by means of guide and activating devices which are not shown. The upper wall 9 of the box 2 has an opening 14 through which the glass panel 12 can pass in order to assume a position between an upper end position and a lower end position in which a lower edge 16 of the panel 12 extends in the vicinity of the lower wall 8 of the box 2.

The structure constituted by the box 2 is strengthened by stiffeners 18 bearing at several places on inner faces of the box 2. The opening 14 is closed by a lip seal 20 regardless of the position of the glass panel 12. On the side where the passenger space 3 is located, the interior lateral wall 7 of the box 2 and also the lip seal are covered by a casing 22, generally produced from rigid plastics material, which acts as a soft trim and which is formed in such a manner as to have a bearing surface 24 forming an arm rest.

Interposed between the interior lateral wall 7 of the box 2 and the casing 22 is a sealing sheet 26 which is generally produced from a supple synthetic material and which is to close completely the passageway between the inner volume of the box 2 and the passenger space 3.

A shock-absorbing device 30 is placed in the box 2 in the vicinity of the lower wall 8 thereof. It comprises two blocks 32, 33 of plastics material, for example polypropylene or ABS, which are arranged one on each side of the passageway for the glass panel 12. The first block 32 bears on the inner face of the exterior lateral wall 6, while the second block 33 bears on the inner face of the interior lateral wall 7 of the box 2. Each of the blocks 32, 33 is secured to the box 2 by way of a securing component 36 in the form of a double angle bracket by conventional clipping or screwing means (not shown). For ease of mounting, the securing component 36 cooperates with the lower wall 8 of the box 2, while one arm of each of the two angle brackets of that securing component 36 supports the respective block 32, 33 by the lower face thereof.

The sealing sheet 26 is adhesively bonded, by its lower portion, between the inner face of the casing 22 and the outer face of the second block 33. The upper portion of the sheet 26 is adhesively bonded to that of the metal sheet 7 in a conventional manner.

It is possible to see the shock-absorbing device 30 in more detail in FIGS. 2 and 3.

Referring to FIG. 2, it can be seen that the first block 32, on its side facing the passageway for the glass panel 12, is fixedly joined to intermediate components 35 extending substantially vertically along the corresponding face of the block 32. Each of the intermediate components 35 carries a plurality of hinge pins 37 which extend substantially horizontally and which are distributed over the height of the respective intermediate component 35. Each row of aligned hinge pins 37 constitutes a pivot axis about which a respective flap 39 is mounted. Each flap 39 is constituted by a plate composed of a plastics material of the same nature as the blocks 32, 33, although it would be possible to provide different materials.

The second block 33 has, opposite the hinge pins 37, respective notches 40 having a substantially horizontal flat abutment face 42 facing downwards, and an inwardly curved face 44 connecting the abutment face 42 to that face of the block 33 which delimits the passageway for the glass panel 12, following the shape of an arc of a circle corresponding to the range of movement of the respective flap 39. As a result, a flap 39 is capable of pivoting downwards about its hinge pin 37 starting from a substantially horizontal position abutting the abutment face 42.

In the absence of the glass panel 12, each flap 39 is held in its horizontal position by the action of a conventional resilient return member associated with the hinge pin 37, such as a spring 45 having two leaves oriented at 90°, one of which is fixedly joined to the flap 39 and the other of which bears on the block 32.

In that position, each flap 39 constitutes a member for mechanical continuity between the two blocks 32 and 33, that is to say, in the case of side impact on the door, the flaps 39 constitute a deformation member in the same way as the blocks 32 and 33 and absorb a portion of the impact energy. The result is an enhanced shock-absorbing quality.

At the passage of the glass panel 12, when the latter is activated to move downwards, the flaps 39 are acted upon in succession to pivot about their hinge pin 37 by the lower edge 16 of the glass panel 12. The flaps 39 are then brought into their inactive position in which they no longer fulfil the shock-absorbing function described above, which position they re-assume, owing to the return action of the spring 45, when the glass panel 12 is again activated to move upwards.

As will be appreciated better from FIG. 3, the intermediate components 35 are constituted by upright inserts which are placed in complementary grooves in the first block 32 and which are distributed uniformly over the length or a portion of the length of the first block 32. The flaps 39, in order to ensure their shock-absorbing function in optimum manner, extend over most of the length of the blocks 32, 33.

The invention substantially improves the shock-absorbing qualities of devices known in this field, thanks to the addition of supplementary members which do not obstruct the passage of the glass panel. Such a device 35–37, 39–45 is in the form of a module which can be mass-produced and installed in a door box, with substantial simplification not only of the mounting and securing operations but also of the operation of adhesively bonding the sealing sheet.

What is claimed is:

1. Device for absorbing impact energy for a door of a motor vehicle, the door (1) being in the form of a roughly parallelepipedal hollow box (2) which has an upper face (9) and a lower face (8) and in which is arranged a glass panel (12) capable of sliding substantially vertically between a lowered position in which it is substantially retracted into the box (2) and a raised position in which it is substantially deployed through the opening (14) of the upper face (9), the absorbing device (30) being arranged in a lower region of the box (2) and comprising two shock-absorbing blocks (32, 33) defining a passageway for the glass panel (12) therebetween, characterized in that it comprises movable members (39) for mechanical connection between the shock-absorbing blocks (32, 33), each of those members (39) being arranged in the passageway for the glass panel (12) in order to assume an active position, in the absence of the glass panel (12), in which it ensures mechanical continuity between the blocks (32, 33) and constitutes a supplementary component for absorbing impact energy, and in order to move out of the way to assume an inactive position when the glass panel (12) passes through.

2. Absorbing device according to claim 1, characterized in that the movable members (39) are flaps pivoting about a respective hinge part (37) which is fixedly joined to at least one (32) of the blocks, the hinge part (37) being provided with a resilient member (41) which returns the flap (39) to its active position.

3. Absorbing device according to claim 2, characterized in that each flap (39), when in its active position, extends substantially horizontally.

4. Absorbing device according to claim 2, wherein the hinge parts are fixedly joined to an intermediate component secured to one of the blocks.

5. Absorbing device according to any one of claims 2, characterized in that notches (40) are formed in at least one (33) of the blocks, facing each hinge part (37), in such a manner as to form an abutment (42) for a free end portion of the respective flap (39), thus defining the active position of the flap.

6. Absorbing device according to any one of claims 1 to 5, characterized in that the movable members (39) and the blocks (32, 33) are formed from the same material.

7. Absorbing device according to claim 1, wherein the blocks are secured to a common anchoring component which is itself rigidly fixed to the box.

8. Motor vehicle door comprising an absorbing device according to any one of claims 1.

9. Motor vehicle door according to claim 8, further comprising a sealing sheet adhesively bonded to a face of the box arranged towards the interior of the vehicle in order to cover a face of the corresponding block, said face of the box is opposite a face thereof defining the passageway for the glass panel.

10. Absorbing device according to claim 3, wherein the hinge parts are fixedly joined to an intermediate component secured to one of the blocks.

* * * * *